Feb. 13, 1962  W. G. KOGEL  3,020,725
ABSORPTION REFRIGERATION
Filed June 9, 1959  2 Sheets-Sheet 1

INVENTOR.
Wilhelm George Kogel
BY
Edmund A. Fenander
his ATTORNEY

Feb. 13, 1962     W. G. KOGEL     3,020,725
ABSORPTION REFRIGERATION
Filed June 9, 1959     2 Sheets-Sheet 2
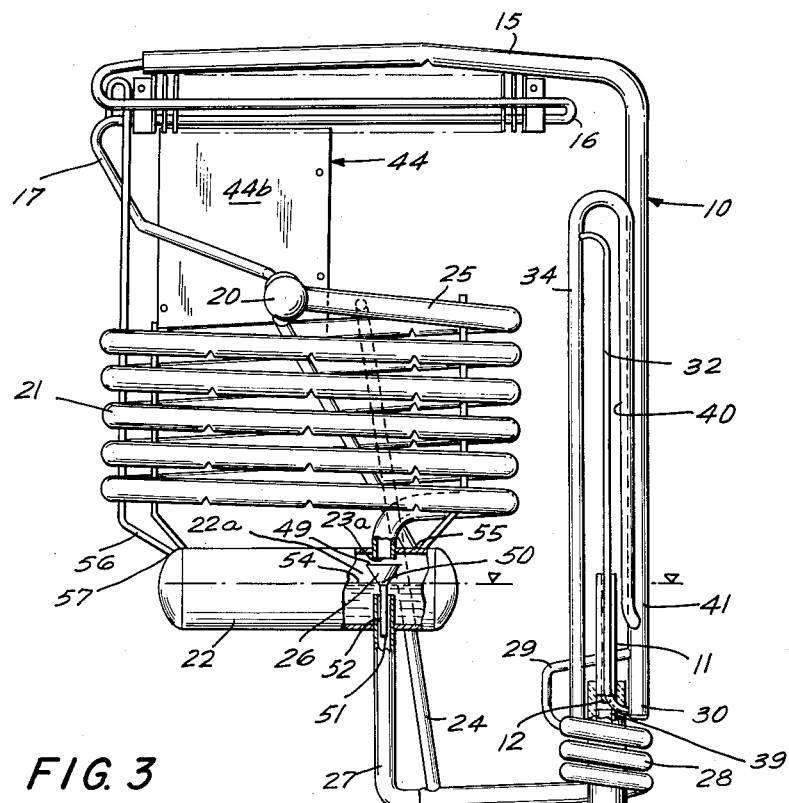
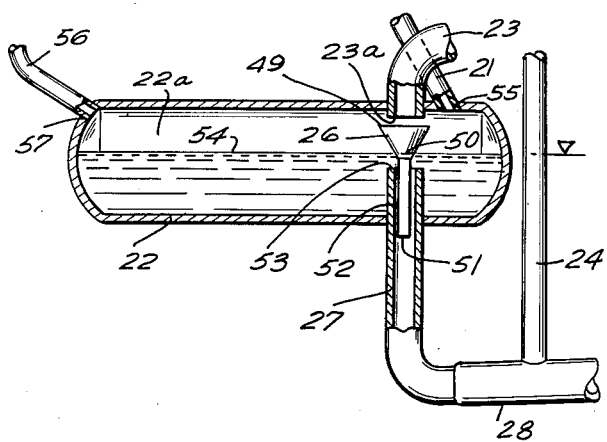
INVENTOR.
Wilhelm Georg Kogel
BY
ATTORNEY United States Patent Office 3,020,725
Patented Feb. 13, 1962

3,020,725
ABSORPTION REFRIGERATION
Wilhelm Georg Kogel, Stockholm, Sweden, assignor to Aktiebolaget Electrolux, Stockholm, Sweden, a corporation of Sweden
Filed June 9, 1959, Ser. No. 819,098
Claims priority, application Sweden June 11, 1958
10 Claims. (Cl. 62—110)

My invention relates to absorption refrigeration, and more particularly to a refrigeration system of this kind employing an auxiliary pressure equalizing gas.

It has been proposed in refrigeration systems of this type that are air-cooled to provide a separate vessel which is connected to the outlet end of the condenser and to the gas circuit, respectively, so that any inert gas that may pass through the condenser can flow into the gas circuit. Refrigerant vapor not liquefied in the condenser due to change in temperature of ambient cooling air flows into such separate vessel to displace inert gas therefrom and force it into the gas circuit. The effect of forcing gas into the gas circuit in this manner is that the total pressure in the entire system is raised, whereby an adequate condensing pressure is obtained which insures condensation of refrigerant vapor in the condenser by the ambient cooling air. For this reason the separate vessel connected in the refrigeration system in the manner just described is usually referred to as a "pressure vessel."

It has usually been the practice to position the pressure vessel above the condenser because the pressure vessel then can serve as an extension of the condenser and any refrigerant vapor condensed therein can flow by gravity to the cooling unit or evaporator together with refrigerant condensed in the condenser proper. Positioning the pressure vessel above the condenser in a narrow vertically extending apparatus compartment of a household refrigerator is objectionable because this increases the overall height of the refrigerator. Further, the heat from the absorber and condenser induces an upward flow of air by natural draft that may be obstructed by the pressure vessel because of its position above the condenser.

It has also been proposed in air-cooled refrigeration systems of this kind to vary the concentration of refrigerant in the absorption liquid circuit with change in temperature of ambient cooling air by accumulating liquid refrigerant under certain operating conditions and subsequently causing such accumulated refrigerant to be introduced into the absorption liquid circuit under certain other operating conditions. The vessel in which liquid refrigerant is accumulated and withdrawn from the absorption liquid circuit is usually referred to as a "concentration vessel" which, at high ambient air temperature, will be effective to reduce the concentration of refrigerant in the absorption liquid sufficiently for the absorber to function to supply to the cooling unit inert gas sufficiently poor in refrigerant vapor to cause liquid refrigerant to evaporate effectively in the cooling unit or evaporator.

It is an object of my invention to provide an improved air-cooled absorption refrigeration system of the inert gas type having a new arrangment and relationship of parts for varying the total pressure in the system with change in ambient air temperature.

Another object is to provide an improvement of this kind for varying the total pressure in the refrigeration system with change in ambient air temperature without employing a separate conventional pressure vessel.

A further object is to provide an improvement of this kind in which a body of a gaseous mixture of inert gas and refrigerant vapor that has a high partial pressure of refrigerant vapor is effectively employed to vary the total pressure in the refrigeration system responsive to change in ambient air temperature.

A still further object is to provide an improvement of this kind in which refrigerant vapor not liquefied in the condenser is vented to the space holding the body of gaseous mixture having a high partial pressure of refrigerant vapor to promote increasing the total pressure in the system responsive to increase in ambient air temperature.

A still further object is to provide an improvement of this kind in which the body of gaseous mixture having a high partial pressure of refrigerant vapor is substantially stagnant under certain operating conditions and forms a gaseous blanket over a body of absorption liquid held in a concentration vessel, the liquid surface layer of the liquid body having a high concentration of refrigerant which is in an equilibrium state with the refrigerant vapor in the gas mixture.

I accomplish this by accumulating liquid refrigerant in a concentration vessel under certain operating conditions and subsequently redistributing absorption liquid in the absorption liquid circuit under certain other operating conditions so that accumulated refrigerant thereafter can be introduced into the absorption liquid circuit. When liquid refrigerant is being accumulated in the concentration vessel holding a body of absorption liquid, a surface layer is formed that has a higher concentration of refrigerant than the absorption liquid enriched with refrigerant in the absorber of the absorption liquid circuit. A body of a gaseous mixture of inert gas and refrigerant vapor, which is in communication with the inert gas circuit, overlies the surface layer enriched in refrigerant in such a manner that the gaseous mixture normally is substantially stagnant and for the most part out of the active portion of the circuit in which inert gas circulates.

The partial pressure of refrigerant vapor in the gas mixture eventually reaches an equilibrium state with the refrigerant in the surface layer of liquid in the concentration vessel, the concentration of refrigerant in the surface layer being relatively high. The partial pressure of refrigerant vapor increases materially with increase in ambient air temperature, and the increase in the partial pressure of refrigerant vapor is advantageously employed to displace inert gas from the gas mixture in the concentration vessel into the gas circuit to increase the total pressure in the system. In the preferred embodiment of the invention disclosed herein, refrigerant vapor not liquefied in the condenser is vented to the vapor space of the concentration vessel to form a surface layer of liquid having a relatively high refrigerant concentration and promote displacing inert gas in the gas mixture into the inert gas circuit to increase the total pressure in the refrigeration system.

The above and other objects and advantages of the invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawing, in which:

FIG. 2 is a view illustrating one practical form of carrying out the invention shown in FIG. 1; and FIG. 3 is an enlarged fragmentary view of parts shown in FIGS. 1 and 2.

Figure 1:
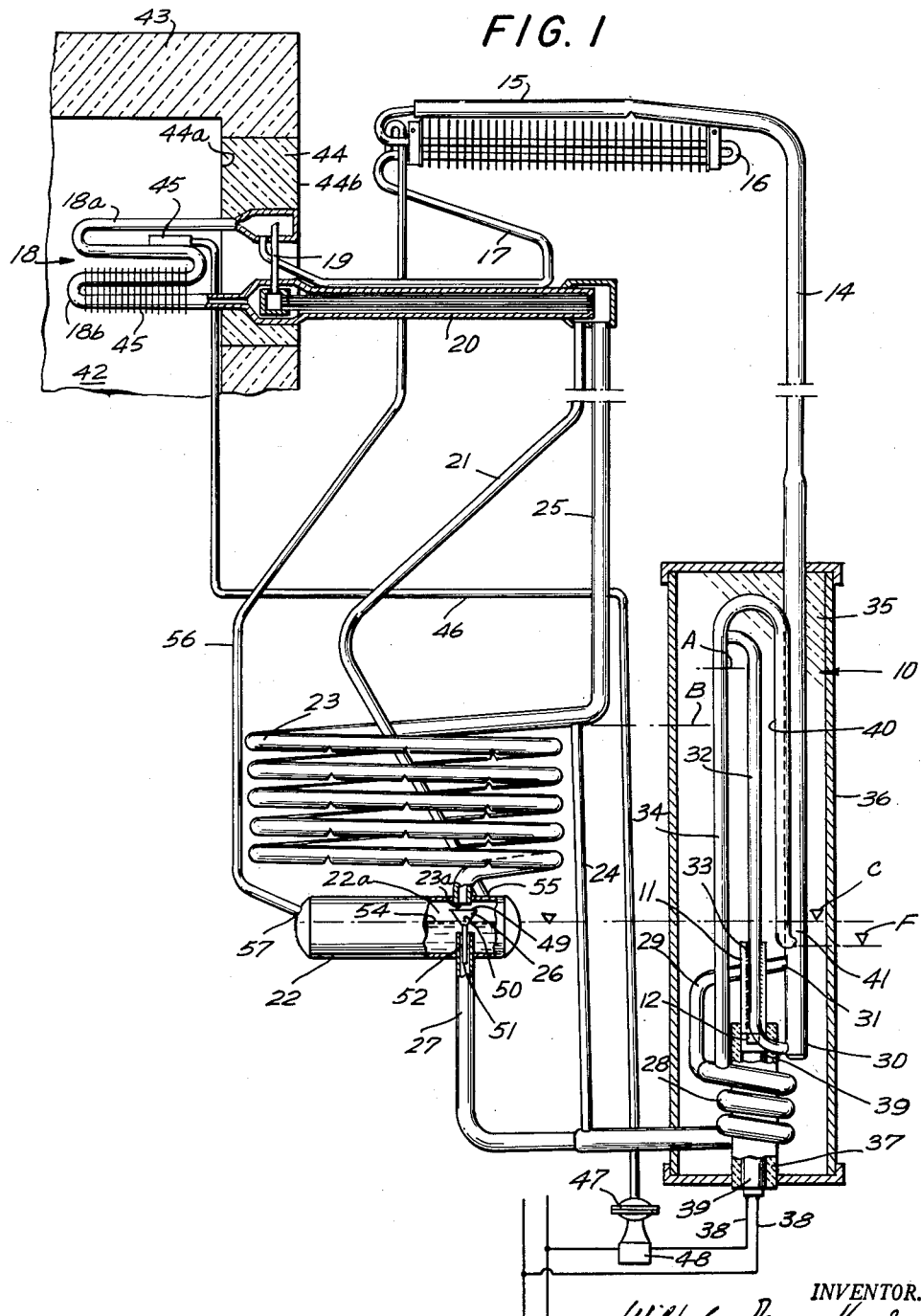
FIG. 1 illustrates more or less diagrammatically an absorption refrigeration system of the inert gas type embodying the invention.

Referring to FIGS. 1 and 2, I have shown my invention embodied in an absorption refrigeration system of a uniform pressure type in which an inert pressure equalizing gas is employed. A refrigeration system of this type comprises a vapor expulsion unit 10 containing a refrigerant, such as ammonia, in solution in a body of absorption liquid, such as water. Heat is supplied to the vapor expulsion unit 10 from a heating tube 11 which may be heated by an electrical heating element 12, for example, which is disposed within the tube.

The heat supplied to the vapor expulsion unit and absorption solution contained therein expels refrigerant vapor out of solution, and, in a manner which will be described hereinafter, the refrigerant vapor passes upwardly from the vapor expulsion unit 10 through a vapor supply line or conduit 14 and an air-cooled rectifier 15 into an air-cooled condenser 16 in the form of a coil having fins fixed thereto. Refrigerant vapor is liquefied in the condenser 16 by surrounding cooling air which flows over the surfaces of the coil and fins, and the liquefied refrigerant flows through a conduit 17 into a cooling unit 18 in which it evaporates and diffuses into an inert pressure equalizing gas, such as hydrogen, which enters through a conduit 19. Due to evaporation of refrigerant fluid into inert gas in cooling unit 18, a refrigerating effect is produced with consequent absorption of heat from the surroundings.

The rich gas mixture of refrigerant vapor and inert gas formed in cooling unit 18 flows from the lower part thereof through one passage of a gas heat exchanger 20, a conduit 21 and a vessel 22 into the lower end of an air-cooled absorber in the form of a looped coil 23. In absorber coil 23 the rich gas mixture flows countercurrent to downwardly flowing absorption liquid which enters through a conduit 24. The absorption liquid absorbs refrigerant vapor from inert gas and inert gas weak in refrigerant flows from absorber coil 23 in a path of flow including a conduit 25, another passage of gas heat exchanger 20 and conduit 19 into the upper part of cooling unit 18. During operation of the refrigeration system, heat is liberated in the absorber 23 due to absorption of refrigerant vapor into absorption liquid. Such heat of absorption is given up to surrounding cool air which passes over the surfaces of the absorber 23, its temperature being determined by the temperature of the cooling air flowing in thermal contact therewith.

The circulation of gas in the gas circuit just described is due to the difference in specific weight of the columns of gas rich and weak, respectively, in refrigerant vapor. Since the column of gas rich in refrigerant vapor and flowing from cooling unit 18 to the absorber coil 23 is heavier than the gas weak in refrigerant and flowing from the absorber coil 23 to cooling unit 18, a force is produced or developed within the system for causing circulation of inert gas in the manner described.

From conduit section 26, which is disposed within the vessel 22, enriched absorption liquid or absorption solution is conducted through a conduit 27, an inner passage of a liquid heat exchanger 28 and a connection 29 into a vertically extending pipe 30 at a point 31 which is at a level below the liquid surface level of the column of liquid held in the pipe 30. The extreme lower end of pipe 30 is in communication with the lower end of a pump pipe or vapor lift tube 32 in thermal exchange relation with the heating tube 11 at 33, as by welding, for example. Liquid is raised by vapor-liquid lift action through tube or pump pipe 32 into the upper part of a standpipe 34.

The absorption liquid from which refrigerant vapor has been expelled flows from standpipe 34 through the outer passage of liquid heat exchanger 28 and conduit 24 into the upper part of absorber coil 23. The circulation of absorption solution in the liquid circuit just described is effected by raising of liquid through the pump pipe 32 from a low level to a higher level A in standpipe 34. Absorption liquid flows by gravity from level A in vapor expulsion unit 10 and passes from the upper end of conduit 24 into the upper end of the absorber coil 23 at the level B. The quantity of liquid held in standpipe 34 between the levels A and B represents the static pressure head required to overcome the resistance offered to flow of liquid from the standpipe to the upper end of the absorber coil 23.

The vapor expulsion unit 10, together with a part of the liquid heat exchanger 28 are embedded in a body of insulating material 35 retained in a metal shell or casing 36 having an opening at the bottom thereof. The electrical heating element 12 is arranged to be positioned within the heating tube 11 through a hollow sleeve member 37 which is formed of suitable insulating material and extends from the bottom of the heating tube 11 to the bottom opening in the shell 36.

The electrical conductors 38 for the electrical heating element 12 extend through an apertured insulating member 39 held in the hollow sleeve member 37. The heating tube 11 snugly receives the heating element 12 which may comprise a cartridge housing an electrical wire or the like having a relatively high resistance that generates heat when connected to a source of electrical energy.

In the operation of the refrigeration system of FIGS. 1 and 2, vapor generated in the vapor lift pipe 32 flows from the upper end thereof through the upper part of standpipe 34 and a conduit 40 to a region 41 in pipe 30 which serves as an analyzer and is disposed below the liquid surface level of the liquid column contained therein.

In FIGS. 1 and 2 all of the generated vapor from the conduit 40 passes through the liquid column in the analyzer 41 by bubble action. The absorption liquid introduced into the analyzer 41 is relatively rich in refrigerant and at a lower temperature than the generated vapor. In bubbling through the enriched solution, absorption liquid vapor is cooled sufficiently and condenses and in this way is removed from refrigerant vapor. As best seen in FIG. 1, liquid refrigerant conducted from condenser 16 to cooling unit 18 through conduit 17 flows in heat exchange relation with the gas heat exchanger 20.

The cooling unit 18 is disposed in a thermally insulated space 42 of a refrigerator cabinet 43 having a removable wall section 44 to facilitate the insertion of the cooling unit within the cabinet, such removable wall section having inner and outer wall faces 44a and 44b. Liquid refrigerant flows by gravity in the cooling unit 18, the refrigerant flowing in parallel flow with the inert gas in a low temperature section 18a and then in a higher temperature section 18b of the cooling unit. While in FIGS. 1 and 2 I have illustrated the gas heat exchanger extending rearwardly from the wall section 44, it will be understood that in practice a compact arrangement of parts is obtained by employing an L-shaped gas heat exchanger (not shown) in which the long arm thereof may be disposed horizontally between the inner and outer faces 44a and 44b of the rear wall section 44 and the short arm thereof projects rearwardly from the outer face 44b.

The refrigeration system just described may be controlled by a thermal bulb 45 which is affected by a temperature condition of cooling unit 18. As shown, the thermal bulb 45 is arranged in thermal exchange relation with the low temperature section 18a of cooling unit 18 and connected by a conduit 46 to a control device 47 which is operatively associated with a switch 48 connected in one of the conductors 38 for supplying electrical energy to heating element 12. The thermal bulb 45 and conduit 46 may form part of an expansible fluid thermostat which is charged with a suitable volatile fluid and responds to changes in temperature of cooling unit 18 to operate control device 47 in a manner well known in the art.

When the temperature of cooling unit 18 increases due, for instance, to increase in heat load caused by placing of warm material in the thermally insulated interior of the refrigerator, or to rise in room air temperature, the thermal bulb 45 in normal operation of the refrigeration system becomes effective to cause control device 47 to close switch 48 and energize heating element 12. Conversely, when the cooling unit 18 reaches a predetermined low temperature, the thermal bulb 45 becomes effective to cause control device 47 to open switch 48 and disconnect heating element 12 from the source of supply of electrical energy.

The refrigeration system of FIGS. 1 and 2 embodies provisions for adjusting the concentration of refrigerant in the absorption liquid circuit by accumulating and storing liquid refrigerant under certain operating conditions, and for subsequently introducing such stored liquid refrigerant into the absorption liquid circuit in a controlled manner. This is accomplished by providing the conduit section 26 within the vessel 23 to form liquid holding spaces adjacent to one another. The conduit section 26 functions as a relatively small absorber vessel, the enlarged upper open end 49 of which forms a liquid inlet to receive absorption liquid from the lower end of the absorber coil 23. The conduit section 26, through which flow of liquid is effected from coil 23 to conduit 27, forms an active portion of the absorption liquid circuit in which the liquid normally circulates during operation of the refrigeration system. During such normal circulation of the absorption liquid, a body of liquid is maintained in the conduit section or absorber vessel 26 having a liquid surface 50 which is below the upper inlet end 49.

The vessel 22 functions as a concentration vessel in which is stored unevaporated refrigerant passing from the cooling unit or evaporator 18. Such excess or unevaporated refrigerant passes from the lower end of cooling unit 18 and flows along the bottom part of the gas heat exchanger 20 and conduit 21 into the vessel 22, the unevaporated refrigerant entering the vessel 22 through conduit 21 with inert gas enriched in refrigerant. The conduit section 26, the bottom end of which is open at 51, is supported in any suitable manner within the upper end of conduit 27 to provide a narrow passage 52 having an open end 53 at a region adjacent to and below the liquid surface 54 in the vessel 22. Hence, a region below the liquid surface level 50 of the liquid body in the conduit section 26 is in free liquid communication with a region below the liquid surface 54 of the liquid body in vessel 22, the connecting passage 52 formed by the upper end of the conduit 27 and conduit section 26 and bottom open end 51 of the latter being completely filled with liquid under all operating conditions of the system. Free liquid communication is established in such manner between the liquid bodies in the conduit section 26 and vessel 22 that the latter constitutes a part which is disposed outside the active portion of the absorption liquid circuit and in which normal flow of absorption liquid is absent.

It will now be understood that a body of absorption liquid is held in the conduit section 26, and that absorption liquid passes through the opening 51 and passage 52 into the vessel 22. Under certain operating conditions, unevaporated refrigerant also passes from the cooling unit 18 into the vessel 22 and accumulates therein. The inert gas enriched in refrigerant flows from the cooling unit 18 through the conduit 21, the lower end of which is in communication with the vapor space of vessel 22. From vessel 22, inert gas enriched in refrigerant flows upwardly through absorber coil 23 in counterflow to the absorption liquid flowing downwardly therein.

Since the upper open end 49 of the conduit section 26 is positioned so that it will always be at a higher level than the liquid surface 54 in the vessel 22, the unevaporated liquid refrigerant accumulated in the vessel 22 essentially will be withdrawn from the absorption liquid circuit. Such refrigerant will be absorbed into absorption liquid held in vessel 22 and increase the concentration of refrigerant in such absorption liquid to a value materially greater than the concentration of refrigerant in the absorption liquid in the conduit section 26 from which absorption liquid flows through conduit 27.

Stored liquid refrigerant in the vessel 22 is positively introduced into the active portion 27 of the absorption liquid circuit in a controlled manner by redistributing the absorption liquid in its circuit and increasing the quantity of such liquid held in the vessel 22. The quantity of liquid held in vessel 22 is increased when the heat supply to the vapor expulsion unit 10 is reduced to render the vapor lift pump 32 inactive, thereby terminating the raising of absorption liquid to the level A in FIGS. 1 and 2. Under these conditions, normal circulation of liquid in the absorption liquid circuit stops and the quantity of liquid held in standpipe 34 between the levels A and B passes into the upper end of the absorber coil 23 from conduit 24. When the pump 32 becomes inactive, some liquid is, therefore, transferred from vapor expulsion unit 10 to absorber coil 23 and passes to conduit section 26, from which liquid flows through its bottom open end 51 through passage 52 into vessel 22 and collects therein. Also, liquid contained in the absorber coil 23 and wetting its inner wall surfaces will flow downwardly into the conduit section 26, thereby causing additional liquid to flow from such conduit section into the vessel 22.

When ammonia and water are employed as the refrigerant and absorption liquid, respectively, and unevaporated ammonia passes from the cooling unit 18 and accumulates in vessel 22 and forms a part of the liquid body therein, the liquid surface level in vessel 22 will be slightly higher than that in conduit section 26 depending upon the increase in concentration of ammonia in the absorption liquid in vessel 22. This is so because, as unevaporated ammonia collects in vessel 22, the specific gravity of the absorption liquid in that vessel decreases, and a liquid body of slightly greater height is required in vessel 22 to balance the body of absorption liquid of less height in the conduit section 26. When unevaporated ammonia has accumulated in vessel 22, and absorption liquid held in other parts of the system is transferred to the conduit section 26, a quantity of absorption liquid flows from the latter to vessel 22 which is substantially the same as that transferred to the conduit section 26.

Let us assume that an air-cooled refrigeration system like that shown in FIGS. 1 and 2 and described above is charged with ammonia, hydrogen and water, so that the system will operate in a satisfactory manner in a normal temperature range of about 68° to 70° F. When the circulation pump 32 in the absorption liquid circuit is in operation, an equilibrium condition is established in which absorption liquid flows at a certain rate into the conduit section 26 and is withdrawn therefrom to the generator 10 at essentially the same rate, and the liquid surface levels in the conduit section 26 and vessel 22 are practically constant. Under these conditions, the liquid column in conduit section 26 balances the liquid column in vessel 22 and passage 52, the gas pressures acting on the liquid surfaces of the liquid bodies in conduit section 26 and vessel 22 being the same.

Active circulation of absorption liquid only takes place through conduit section 26 during normal operation, and the passage 52 and vessel 22 essentially constitute a dead-end appendage for absorption liquid in which the liquid body is more or less stagnant. In such normal operation of the system, the thermostatic control will be operable to shut off the heat supply to the vapor expulsion unit 10 when the cooling unit 18 reaches a predetermined low temperature, and substantially all of the liquid refrigerant will be evaporated therein. Also, the conduit section 26 of the absorption liquid circuit will function in the normal manner explained above. When there is a slight change in the liquid level in vessel 22 during normal operation of the system, there is a corresponding change in the liquid level in conduit section 26, because the liquid columns of these liquid bodies balance one another.

Let us now assume that the ambient air temperature increases upwards to about 95° to 100° F., so that the heat of absorption produced in the absorber coil 23 under the new operating conditions will not be effectively given up to the ambient air flowing in thermal relation therewith. Under such conditions, refrigerant vapor will not be effectively absorbed into absorption liquid in the absorber coil 23, and inert gas will flow to cooling unit 18 having an abnormally high concentration of refrigerant vapor, so that the cooling unit 18 will not be capable of producing the desired low refrigerating temperature for which the thermostatic control is adjusted. Under these assumed conditions, the thermostatic control will function to continue the heat supply to the vapor expulsion unit 10. By reason of the abnormally high partial pressure of refrigerant vapor in the inert gas introduced into the cooling unit 18, all of the liquid refrigerant supplied to the cooling unit 18 will not be evaporated therein, and the excess unevaporated refrigerant passing from the cooling unit 18 will flow to the vessel 22 in which it is accumulated and stored.

By storing unevaporated liquid refrigerant in vessel 22, such refrigerant in effect is withheld or withdrawn from the absorption liquid circuit; and the concentration of refrigerant in the absorption liquid eventually will be reduced adequately, so that absorption liquid having a sufficiently low concentration of refrigerant will be supplied to absorber coil 23 from vapor expulsion unit 10. This will enable the absorber to function properly even at the higher ambient air temperature, thereby enabling the absorber to supply inert gas to cooling unit 18 which will be sufficiently poor in refrigerant vapor to cause substantially all of the liquid refrigerant to evaporate in the cooling unit 18.

When the ambient air temperature decreases from the high value assumed above and begins to approach the normal temperature range, it is highly desirable to increase the concentration of refrigerant in the absorption liquid as soon as possible. This is so because, in the lower or normal temperature range, such increase in concentration of refrigerant in the absorption liquid makes it possible to operate the vapor expulsion unit 10 at a lower temperature, which means that the radiation losses will be reduced, the generator can be operated with less heat input, and the rectification losses will be decreased.

Such decrease in ambient air temperature to the normal temperature range may occur during the nighttime, for example, which in turn reduces the load on the refrigeration system. Under these conditions, the temperature of cooling unit 18 also will decrease; and, when the latter reaches the predetermined low temperature referred to above, the thermostatic control will be operable to shut off the heat supply to the vapor expulsion unit 10. This will interrupt the normal circulation of absorption liquid and cause liquid to be transferred to the conduit section 26 from other parts of the system. By reason of the free liquid communication between the conduit section 26 and the vessel 22, absorption liquid flows from conduit section 26 through its bottom opening 51 and passage 52 into vessel 22 when absorption liquid is transferred to the conduit section 26.

After an interval of time, the temperature of evaporator 18 will rise sufficiently to cause the thermostatic control to function and start the heat supply to the vapor expulsion unit 10, at which time pump 32 becomes active. Liquid will now be withdrawn from vessel 22 by the pump 32, although it should be understood that normal circulation of absorption liquid in this vessel usually is absent. After the pump 32 starts raising liquid into the upper end of standpipe 34, an interval of time will pass before absorption liquid again flows into the conduit section 26. Hence, the entire quantity of liquid held in the vessel 22 will be reduced to an extent corresponding to the accumulation of liquid in the vessel 22 when the normal circulation of absorption liquid is reduced and liquid in the absorption liquid circuit is transferred to the conduit section 26.

When the new pumping period commences, the part of standpipe 34 between the levels A and B is depleted of liquid; and the absorber coil 23 can accumulate a comparatively large amount of liquid at its inner wall surfaces, due to the action of capillary and adhesive forces, before a stream of liquid passes through the entire length of the absorber coil. In view of the manner in which normal circulation of absorption liquid is resumed, a certain amount of absorption liquid relatively rich in refrigerant will pass from the upper part of vessel 22 into the active portion of the absorption liquid circuit when pumping is started following a shut-down period. When absorption liquid again flows into conduit section 26 from coil 23 and an equilibrium condition is established, the liquid levels in the conduit section 26 and the vessel 22 will be essentially the same due to the free liquid communication therebetween and the same gaseous atmosphere enveloping the liquid bodies in both vessels.

When the pump 32 again becomes operable to circulate absorption liquid in its circuit following a shut-down period, an interval of time passes before absorption liquid flows from the absorber coil 23 into the upper open end of the conduit section 26, as explained above. Accordingly, the liquid initially supplied to the inlet of the pump 32 flows thereto from the vessel 22 and conduit section 26. Since the quantity of liquid held in the conduit section 26 is relatively small compared to the quantity held in the vessel 22, practically all of the liquid supplied to the pump 32, when operation thereof is started, comes from the vessel 22. Further, since liquid from the top part of vessel 22 flows into the upper open end 53 of the passage 52 when liquid is being withdrawn from the vessel under these conditions, the liquid initially supplied to the pump 32, when operation thereof is started, is relatively rich in refrigerant. This is so because the liquid in the top surface layer or stratum in the vessel 22 has a relatively high concentration of refrigerant.

In accordance with my invention, the concentration vessel 22 is connected in the inert gas circuit in such a manner that it can be effectively employed to vary the total pressure in the system responsive to change in ambient air temperature. To this end, the lower end of conduit 21, through which inert gas enriched in refrigerant flows downwardly from cooling unit 18, is connected to the top part of vessel 22 at a region 55 which is closely adjacent to and at the immediate vicinity of the lower open end 23a of the absorber coil 23. The region 55 at which conduit 21 is connected to vessel 22 is offset laterally from the inlet opening 49 of the conduit section 26 so that unevaporated refrigerant flowing from the cooling unit 18 to the vessel 22 under certain operating conditions will collect in the body of absorption liquid formed about the conduit section 26.

By arranging the lower open ends of the absorber coil 23 and conduit 21 closely adjacent to one another, inert gas enriched in refrigerant flows downwardly in conduit 21 and for all practical purposes immediately reverses its direction of flow and enters the lower open end 23a of absorber coil 23 for upward flow in the latter in the presence of downwardly flowing absorption liquid in which refrigerant is absorbed into solution. In this way, the gas mixture in the vapor space 22a of vessel 22 is practically undisturbed and active circulation of the gas mixture in the space 22a is substantially avoided. If the lower end of conduit 21 were connected to the vessel 22 at a point far removed from lower open end 23a of the absorber coil 23, the entering rich inert gas would flow through the vapor space 22a for a substantial distance of its length and cause objectionable circulation of gas in the vapor space.

By having the lower end of absorber coil 23 and conduit 21 as near together as practically possible, the rich inert gas flows more or less directly from conduit 21 into the lower open end 23a of absorber coil 23 and the vapor space 22a essentially forms a dead-end pocket for the gas mixture in the vapor space 22a, the dead-end pocket being in communication with the inert gas circuit and for all practical purposes forming an inactive part thereof in which active circulation of gas is substantially avoided.

As pointed out above, the concentration of refrigerant in the top surface layer of liquid in the vessel 22 is relatively high. In the preferred embodiment, this top surface layer of liquid rich in refrigerant is formed in vessel 22 by conducting unevaporated refrigerant from cooling unit 18 to vessel 22 under certain operating conditions, as explained above. Since the body of liquid in vessel 22 disposed about conduit section 26 during normal operation of the system does not form an active portion of the absorption liquid circuit, this liquid body normally is substantially stagnant and unevaporated refrigerant introduced into the vessel 22 through conduit 21 is mixed with the absorption liquid. When ammonia and water are employed as the refrigerant and absorption liquid, respectively, the liquid ammonia tends to collect at the top surface of the liquid body and form a surface layer of liquid having a relatively high concentration of refrigerant.

In absorber coil 23 refrigerant is absorbed from the rich gas mixture into downwardly flowing absorption liquid which is discharged from its lower open end 23a and normally flows through the conduit section 26 and conduit 27 to the lift pump 32. While enriched absorption liquid flowing through conduit section 26 is in physical contact with absorption liquid in the bottom part of passage 52, such physical contact is negligible and will not disturb the body of liquid in vessel 22 which is disposed outside the active portion of the absorption liquid circuit and in which normal flow of absorption liquid is absent. With this arrangement, the concentration of refrigerant in the top surface layer of liquid in the vessel 22 will increase to a value materially greater than the concentration of refrigerant in the absorption liquid passing from the lower end 23a of absorber coil 23 and flowing to the lift pump 32 through the conduit section 26 and conduit 27.

By virtue of the fact that the concentration of refrigerant in the top surface layer of liquid in the vessel 22 is relatively high, the gas mixture in the space 22a also will have a relatively high partial pressure of refrigerant vapor corresponding to the high concentration of refrigerant in the top surface layer of the absorption liquid. In other words, a state of equilibrium between liquid refrigerant and its vapor will be reached and maintained in vessel 22 as the concentration of refrigerant in the top surface layer of liquid becomes greater due to flow of unevaporated refrigerant into the vessel through conduit 21.

The volume of the vapor space 22a in vessel 22 is related to the remainder of the volume of the inert gas circuit in such a manner that the essentially stagnant vapor blanket overlying the liquid body in vessel 22, having a relatively high partial pressure of refrigerant vapor which varies with change in temperature, can be effectively employed to vary the total pressure in the refrigeration system responsive to change in ambient air temperature. While I do not wish to be limited thereto, it is believed the following specific examples of operation in a normal temperature range and at a higher temperature level will illustrate clearly the manner in which the concentration vessel 22 is employed to increase the total pressure in the refrigeration system responsive to increase in ambient air temperature.

At the outset it should be understood that the concentration of refrigerant in the top surface layer of liquid in vessel 22 will not remain the same and varies under different operating conditions of the refrigeration system. At a normal room temperature of about 68° F., for example, the refrigeration system of FIGS. 1 and 2 being operated thermostatically in the manner described above with ammonia, hydrogen and water being employed as the refrigerant, inert gas and absorption liquid, respectively, the concentration of refrigerant in the top surface layer of absorption liquid may be about 40% and the partial pressure of refrigerant vapor in the gas mixture in space 22a will be about 1.5 kg./cm.$^2$. If the ambient air temperature should now rise from 68° F. to about 95° F., the concentration of refrigerant in the top surface layer of absorption liquid may be about 70% and the partial pressure of refrigerant vapor in the gas mixture in space 22a will be about 8.0 kg./cm.$^2$. The partial pressure of the inert gas is affected only slightly by increase in the ambient air temperature. The increase in volume of the refrigerant vapor resulting from its increase in pressure causes the gas mixture in space 22a of concentration vessel 22, which includes inert gas, to be displaced therefrom to other parts of the refrigeration system and in this way raise the total pressure in the system, so that an adequate condensing pressure will be obtained to insure condensation of refrigerant vapor in the condenser 16 by the ambient cooling air. It should be understood that if the ambient air temperature should increase further, as to 110° F., for example, the concentration of refrigerant in the top surface layer of absorption liquid in the vessel 22 will become even greater which in turn will increase the partial vapor pressure of refrigerant and cause an even further increase in the total pressure in the refrigeration system.

If the concentration vessel 22 could not be employed to increase the total pressure in the system in response to increase in ambient air temperature, in the manner just described, it would be necessary to charge the system initially with inert gas to a much higher pressure to insure its operation at higher ambient air temperatures normally encountered during the summer. By being able to use the concentration vessel 22 to increase the total pressure in the system with increase in ambient air temperature, the system can be operated at a lower pressure in a normal temperature range of 68° to 70° F. than a refrigeration system initially charged to operate at high as well as normal ambient air temperatures, whereby the vapor expulsion unit 10 can be operated with less heat input.

A refrigeration system of the kind under consideration usually is provided with a vent conduit which is connected to the outlet end of the condenser and to a part of the inert gas circuit, such as, for example, a part of the inert gas connection through which inert gas enriched in refrigerant flows from the cooling unit to the absorber coil. The vent conduit provides a path of flow to the gas circuit for any inert gas that may pass through the condenser and also for refrigerant vapor that is not liquefied in the condenser.

In accordance with my invention, a vent conduit 56 is connected to the outlet end of the condenser 16 for conducting refrigerant vapor not liquefied therein to the concentration vessel 22 at a region 57 which is removed as far as possible from the lower open end 23a of absorber coil 23 and the region 55 at which the conduit 21 is connected to the vessel. When all of the refrigerant vapor supplied to the condenser 16 is not condensed therein at high ambient air temperatures, refrigerant vapor will pass through the vent conduit 56 into the concentration vessel 22. The refrigerant vapor introduced into the concentration vessel 22 at 57, which has a high partial pressure, will pass over the surface of the liquid body in the concentration vessel. Since the refrigerant vapor entering the vessel 22 through vent conduit 56 is substantially pure refrigerant, the concentration of refrigerant in the top surface layer of liquid will become even greater than otherwise would be the case and the partial pressure of refrigerant vapor in the gas mixture in space 22a will also increase proportionately. Hence, in the particular examples given above, the concentration of refrigerant in the top surface layer of absorption liquid in vessel 22 and the partial pressure of refrigerant vapor in space 22a is influenced by the introduction into the concentration vessel 22 of any refrigerant vapor that is not liquefied in the condenser. Refrigerant vapor entering the vessel 22 at 57 will displace the gas mixture from the space 22a into other parts of the refrigeration system and the displaced inert gas in the mixture becomes effective to increase the total pressure in the system so that an adequate condensing pressure will be obtained in the condenser 16 for the ambient air at the higher temperature.

Modifications of the embodiment of the invention which I have described and illustrated will occur to those skilled in the art, so that I do not desire to be limited to the particular arrangement set forth. For example, the lower ends of the absorber coil 23 and conduit 21 may be connected to one another exteriorly of the vessel 22 in such a manner that unevaporated refrigerant from cooling unit 18 can flow into the vessel. Therefore, I intend in the claims to cover all those modifications and features which do no depart from the spirit and scope of my invention.

I claim:

1. In the art of refrigeration with the aid of a system in which refrigerant vapor is expelled from absorption liquid in a vapor expulsion unit, refrigerant vapor is condensed to liquid in a condenser cooled by ambient air, liquid refrigerant condensed in the condenser is introduced into an evaporator and evaporates therein in the presence of an inert gas to form a gas mixture, refrigerant vapor is absorbed from inert gas by absorption liquid in an absorber cooled by ambient air, inert gas is circulated in a circuit through and between the evaporator and absorber and absorption liquid is circulated in a path of flow through and between the vapor expulsion unit and the absorber, the improvement which comprises the steps of flowing absorption liquid through the absorber by gravity in the presence of the inert gas in an elongated path having an inlet at one level and an outlet at a lower level, holding in a first place in communication with the inert gas circuit a body of absorption liquid having a liquid surface which is at a lower level than that of the absorber outlet and whose level is dependent upon the absorption liquid discharged from the outlet into a body of liquid in a second place having a region below its surface in communication with a region below the surface of the liquid body in the first place, supplying substantially pure liquid refrigerant in the system to the liquid body in the first place to increase the concentration of refrigerant in the top liquid surface layer of the liquid body to a value which exceeds the concentration of refrigerant in the absorption liquid flowing from the outlet of the absorber, maintaining in a vapor space in the first place, in intimate physical contact with the liquid body therein, a gaseous blanket comprising a mixture of inert gas and refrigerant vapor which is relatively stagnant and sufficiently unaffected by circulation of inert gas in its circuit to increase the partial pressure of refrigerant vapor in the gaseous blanket until it reaches a state of equilibrium with the liquid and has a value corresponding to the concentration of refrigerant in the top liquid surface layer of the liquid body, flowing uncondensed refrigerant vapor from the outlet end of the condenser to the vapor space in the first place to increase the total pressure in the system in accordance with increases in ambient air temperature, and promoting the increase in the total pressure in the system by introducing the uncondensed refrigerant vapor into the vapor space in the first place as substantially pure refrigerant and in the same physical state as when it leaves the outlet end of the condenser to increase further the concentration of refrigerant in the top liquid surface layer of the liquid body in the first place and also proportionately increase the partial pressure of refrigerant vapor in the gaseous blanket in intimate physical contact therewith.

2. The improvement set forth in claim 1 which includes flowing unevaporated refrigerant from the evaporator to the first place to supply the latter with substantially pure refrigerant.

3. The improvement set forth in claim 2 which includes flowing unevaporated refrigerant from the evaporator to the first place upon increase in ambient air temperature.

4. The improvement set forth in claim 3 in which the vapor expulsion unit is heated by a source of heat to cause expulsion of refrigerant vapor from absorption liquid, controlling the source of heat in accordance with a temperature condition affected by the evaporator, the source of heat supplying heat substantially continuously to the vapor expulsion unit with sufficient increase in temperature of ambient air, and supplying refrigerant including refrigerant vapor and condensate to the liquid body in the first place during the aforementioned continuous heating of the vapor expulsion unit by the source of heat to increase the concentration of refrigerant in the top surface layer of the last-mentioned liquid body to a value between the concentration of refrigerant in the absorption liquid flowing from the outlet of the absorber and saturation.

5. The improvement set forth in claim 1 which includes the steps of flowing inert gas through the vapor space of the first place to maintain in intimate physical contact with the liquid surface of the liquid body therein the gaseous blanket comprising a mixture of inert gas and refrigerant vapor, and introducing inert gas from the evaporator into the vapor space of the first place and withdrawing inert gas from the vapor space at regions sufficiently close to one another to provide the gaseous blanket which is relatively stagnant and sufficiently unaffected by circulation of inert gas through the vapor space to increase the partial pressure of refrigerant in the gaseous blanket until it reaches a state of equilibrium with the liquid and has a value corresponding to the concentration of refrigerant in the top liquid surface layer of the liquid body.

6. An air-cooled hermetically closed absorption refrigeration system containing refrigerant, inert gas and absorption liquid, said system comprising circuits for circulation of the aforementioned fluids, the circuit for refrigerant including a condenser adapted to be cooled by ambient air, the circuit for circulation of absorption liquid comprising a vapor expulsion unit and an absorber adapted to be cooled by ambient air comprising piping providing an elongated path of flow for liquid, the circuit for inert gas including an evaporator and said piping, means for conducting liquid refrigerant from said condenser to said evaporator, said absorption liquid circuit further including means providing a first place for holding a body of absorption liquid and a vapor space above the liquid body, said first place having an inlet connected to receive liquid from said absorber piping and an outlet for the liquid and forming an active portion of the absorption liquid circuit in which liquid flows from the inlet to the outlet during normal operation of the system, means providing a second place for holding a body of absorption liquid and a vapor space above such liquid body, means establishing free liquid communication between said first and second places beneath the liquid surfaces of the bodies of absorption liquid therein, the system comprising means for conducting substantially pure refrigerant to said second place to increase the concentration of refrigerant in the top liquid surface layer of the liquid body therein to a value which exceeds the concentration of refrigerant in the absorption liquid flowing from the absorber piping, said absorption liquid circuit embodying provisions whereby absorption liquid from elsewhere in the circuit is transferred to said first place when the normal circulation of absorption liquid is substantially terminated, said means establishing free liquid communication between said first and second places serving as a path of flow through which liquid passes from said first place to said second place when liquid is transferred to said first place, said circuit for absorption liquid including provisions for flowing both liquid refrigerant and absorption liquid from said second place to said vapor expulsion unit when normal circulation of absorption liquid is resumed, the vapor spaces above the liquid surfaces of the liquid bodies in said first and second places being in communication with one another and with the circuit for inert gas to provide in the vapor space of said second place a gaseous blanket comprising a mixture of inert gas and refrigerant vapor, said circuit for inert gas being so constructed and arranged that said gaseous blanket is relaively stagnant and sufficiently unaffected by circulation of inert gas in its circuit to increase the partial pressure of refrigerant vapor in the gaseous blanket until it reaches a state of equilibrium with the liquid and has a value corresponding to the concentration of refrigerant in the top liquid surface layer of the liquid body in said second place, and means for conducting uncondensed refrigerant vapor from the outlet end of said condenser to the vapor space in said second place to increase the total pressure in the system responsive to increase in ambient air temperature, said last-mentioned means being constructed and arranged to introduce the uncondensed refrigerant vapor into the vapor space in said second place as substantially pure refrigerant and in the same physical state as when it leaves the outlet end of said condenser to increase further the concentration of refrigerant in the top liquid surface layer of the liquid body in the second place and also proportionately increase the partial pressure of refrigerant vapor in the gaseous blanket in intimate physical contact therewith.

7. An absorption refrigeration system as set forth in claim 6 in which said vapor expulsion unit includes a pump for raising liquid by vapor lift action, and said means for conducting substantially pure refrigerant to said second place and said absorber piping from which liquid passes to said first place being so constructed and arranged that absorption liquid enriched in refrigerant which passes from said absorber piping and has a particular concentration of refrigerant will be separated from inert gas which is enriched in refrigerant and about to enter said absorber piping and thereafter will be supplied to said pump having substantially the same particular concentration of refrigerant, especially when the ambient air temperature is in a normal range of about 68° to 70° F.

8. An absorption refrigeration system as set forth in claim 6 in which said circuit for inert gas is so constructed and arranged that inert gas enriched in refrigerant is introduced into the vapor space of said second place at a region adjacent to and at the immediate vicinity at which absorption liquid passes from said absorber piping whereby the gaseous blanket is relatively stagnant and sufficiently unaffected by circulating inert gas enriched in refrigerant to influence the partial pressure of refrigerant vapor in the gaseous blanket and the concentration of refrigerant in the top liquid surface layer of the liquid body in said second place, said conduit means for conducting substantially pure refrigerant to said second place including the part of said inert gas circuit through which inert gas enriched in refrigerant is introduced to the vapor space of said second place.

9. An absorption refrigeration system as set forth in claim 6 in which said means for conducting uncondensed refrigerant vapor from the outlet end of said condenser includes tubing connected to a point of said second place which is removed from the region at which the vapor spaces of said first and second places are in communication with the circuit for inert gas.

10. An absorption refrigeration system as set forth in claim 6 in which said circuit for inert gas is so constructed and arranged that inert gas enriched in refrigerant is introduced into the vapor space of said second place at a region adjacent to and in the immediate vicinity at which absorption liquid passes from said absorber piping, said means for conducting uncondensed refrigerant vapor from the output end of said condenser to the vapor space of said second place including tubing, said tubing being connected to a point in said second place which is removed from the region at which the vapor spaces of said first and second places are in communication with the circuit for inert gas, and said means for conducting substantially pure refrigerant to said second place including the part of said inert gas circuit through which inert gas enriched in refrigerant and unevaporated liquid refrigerant from said evaporator is introduced to the vapor space of said second place.

References Cited in the file of this patent

UNITED STATES PATENTS

| | | |
|---|---|---|
| 1,924,770 | Backstrom | Aug. 29, 1933 |
| 2,172,442 | Grubb et al. | Sept. 12, 1939 |
| 2,795,940 | Kogel | June 18, 1957 |
| 2,795,941 | Hellstrom | June 18, 1957 |
| 2,842,943 | Kogel | July 15, 1958 |